(12) United States Patent
Beuterbaugh et al.

(10) Patent No.: US 10,590,335 B2
(45) Date of Patent: Mar. 17, 2020

(54) METHODS, TREATMENT FLUIDS AND SYSTEMS UTILIZING A PARTICULATE PACK FOR ACIDIZING A SILICEOUS MATERIAL

(71) Applicant: Halliburton Energy Services, Inc., Houston, TX (US)

(72) Inventors: Aaron M. Beuterbaugh, Spring, TX (US); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/755,049

(22) PCT Filed: Sep. 30, 2015

(86) PCT No.: PCT/US2015/053209
§ 371 (c)(1),
(2) Date: Feb. 23, 2018

(87) PCT Pub. No.: WO2017/058202
PCT Pub. Date: Apr. 6, 2017

(65) Prior Publication Data
US 2018/0251672 A1  Sep. 6, 2018

(51) Int. Cl.
*E21B 43/267* (2006.01)
*C09K 8/72* (2006.01)
(Continued)

(52) U.S. Cl.
CPC .................. *C09K 8/72* (2013.01); *C09K 8/80* (2013.01); *C09K 8/92* (2013.01); *E21B 43/26* (2013.01); *E21B 43/267* (2013.01)

(58) Field of Classification Search
None
See application file for complete search history.

(56) References Cited

U.S. PATENT DOCUMENTS 7,431,089 B1 10/2008 Couillet et al.
8,789,596 B2 7/2014 Curtis et al.
(Continued)

OTHER PUBLICATIONS

International Search Report and Written Opinion from PCT/US2015/053209, dated Jun. 24, 2016, 15 pages.

*Primary Examiner* — Andrew Sue-Ako
(74) *Attorney, Agent, or Firm* — Thomas Rooney; C. Tumey Law Group PLLC

(57) ABSTRACT

The rapid reaction of hydrofluoric acid with siliceous materials can make it difficult to achieve localized dissolution of siliceous minerals during subterranean stimulation operations. Methods for stimulating a subterranean formation in the presence of a particulate pack can comprise: providing a latent hydrofluoric acid composition comprising a degradable matrix, and a hydrofluoric acid precursor dispersed in the degradable matrix; setting a particulate pack in a wellbore or in a subterranean formation comprising a siliceous material that is penetrated by the wellbore, the particulate pack comprising particulates and a solid form of the latent hydrofluoric acid composition; degrading at least a portion of the degradable matrix, thereby exposing at least a portion of the hydrofluoric acid precursor; converting the exposed hydrofluoric acid precursor into hydrofluoric acid; and reacting the hydrofluoric acid with the siliceous material adjacent to a location in the particulate pack where the latent hydrofluoric acid composition was present.

21 Claims, 5 Drawing Sheets

(51) Int. Cl.
*E21B 43/26* (2006.01)
*C09K 8/80* (2006.01)
*C09K 8/92* (2006.01)

(56) References Cited

U.S. PATENT DOCUMENTS

| | | | |
|---|---|---|---|
| 10,053,621 B2* | 8/2018 | Fontenelle | C09K 8/92 |
| 2005/0113263 A1 | 5/2005 | Brown et al. | |
| 2006/0032636 A1 | 2/2006 | Lord et al. | |
| 2006/0054325 A1 | 3/2006 | Brown et al. | |
| 2006/0058197 A1* | 3/2006 | Brown | C09K 8/68 |
| | | | 507/103 |
| 2008/0139416 A1* | 6/2008 | Rimassa | C09K 8/508 |
| | | | 507/241 |
| 2008/0182761 A1 | 7/2008 | Stephenson et al. | |
| 2008/0207470 A1 | 8/2008 | Welton | |
| 2008/0314594 A1* | 12/2008 | Still | C09K 8/72 |
| | | | 166/307 |
| 2012/0067581 A1* | 3/2012 | Auzerais | C04B 40/0633 |
| | | | 166/308.1 |
| 2013/0192839 A1 | 8/2013 | Brown et al. | |
| 2014/0069643 A1 | 3/2014 | Ogle et al. | |
| 2014/0138092 A1 | 5/2014 | Reddy et al. | |
| 2014/0166286 A1 | 6/2014 | Nguyen et al. | |
| 2016/0272879 A1* | 9/2016 | Reddy | C09K 8/72 |
| 2018/0251673 A1* | 9/2018 | Beuterbaugh | C09K 8/528 |

* cited by examiner

METHODS, TREATMENT FLUIDS AND SYSTEMS UTILIZING A PARTICULATE PACK FOR ACIDIZING A SILICEOUS MATERIAL

BACKGROUND

The present disclosure generally relates to subterranean stimulation operations and, more specifically, to treatment fluids and methods for acidizing a siliceous material.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof will refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

Acidizing operations may be used to stimulate a subterranean formation to increase production of a hydrocarbon resource therefrom. During an acidizing operation, an acid-soluble material in the formation matrix can be dissolved by one or more acids to expand existing flow pathways in the subterranean formation or to create new flow pathways in the subterranean formation. Acid-soluble precipitation damage (i.e., scale) may be removed from the subterranean environment in a related manner. Illustrative substances within the formation matrix that may be dissolved by an acid include, but are not limited to, carbonate materials, siliceous materials, ferrous or ferric materials, or any combination thereof. Introduction of an acidizing fluid to a subterranean formation may take place at matrix flow rates without fracturing of the formation matrix, or at higher injection rates and pressures to fracture the formation matrix (i.e., an acid-fracturing operation).

Carbonate formations can contain minerals, such as calcite or dolomite, which comprise a carbonate anion and a metal counter ion. When acidizing a carbonate formation, the acidity of a treatment fluid alone can often be sufficient to consume the carbonate anion and thereby affect dissolution of the carbonate mineral. Both mineral acids (e.g., hydrochloric acid) and organic acids (e.g., acetic acid and formic acid) can be used to acidize a carbonate formation, often with relatively similar degrees of success. The reaction of such acids with carbonate minerals can generate wormholes and other permeability-enhancing features in the formation matrix. The heterogeneous lithology of carbonate formations can also facilitate the generation of such permeability-enhancing features during an acidizing operation, such as through differential etching and uneven surface dissolution. The increased formation permeability may improve production of a hydrocarbon resource from the formation.

Siliceous formations can include minerals such as, for example, zeolites, clays, and feldspars. As used herein, the term "siliceous" will refer to any substance having the characteristics of silica, including silicates and/or aluminosilicates. The mineral acids and organic acids that are usually effective for dissolving carbonate minerals are generally ineffective for affecting dissolution of siliceous minerals. In contrast, hydrofluoric acid, another mineral acid, can react very rapidly with siliceous materials to promote their dissolution. Additional mineral acids or organic acids may be used in combination with hydrofluoric acid in order to maintain a low pH state as the hydrofluoric acid spends upon reacting with the siliceous material. Unlike the case of carbonate mineral-acidizing operations, the rapid reaction rate of hydrofluoric acid with siliceous minerals can discourage differential etching to form wormhole-like structures and other permeability-enhancing features within the formation matrix. Instead, the hydrofluoric acid usually reacts proximate to its location of first contact with the siliceous mineral, such as in the near-wellbore area. As a result, deeper penetration of the hydrofluoric acid into the formation matrix is typically precluded and the stimulation effect is relatively minimal.

In addition, many siliceous, sedimentary minerals, such as shale, sandstone and mudstone, can have low native permeability values that may further discourage deep penetration of an acidizing fluid into the formation matrix. In these and many other unconventional reservoirs, native permeability values may be below about 0.1 millidarcy, often residing in the nanodarcy range, thereby making these reservoirs highly impermeable to fluid flow. Although fracturing operations may be used to create a fracture network de novo and/or to expand an existing fracture network in a low-permeability siliceous material, ideally stimulating production as a result, further stimulation through an acidizing operation may be difficult to achieve conventionally due to the aforementioned issues associated with the high reactivity of hydrofluoric acid toward siliceous minerals. As used herein, the term "fracture network" will refer to a series of interconnected conduits within a subterranean matrix material that are collectively in fluid communication with a wellbore. The interconnected conduits will also be referred to herein as "fractures," and they may be naturally occurring, manmade, or any combination thereof. Fractures may be created or extended upon introducing a fluid to a wellbore at or above a fracture gradient pressure of the subterranean matrix material.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1A:
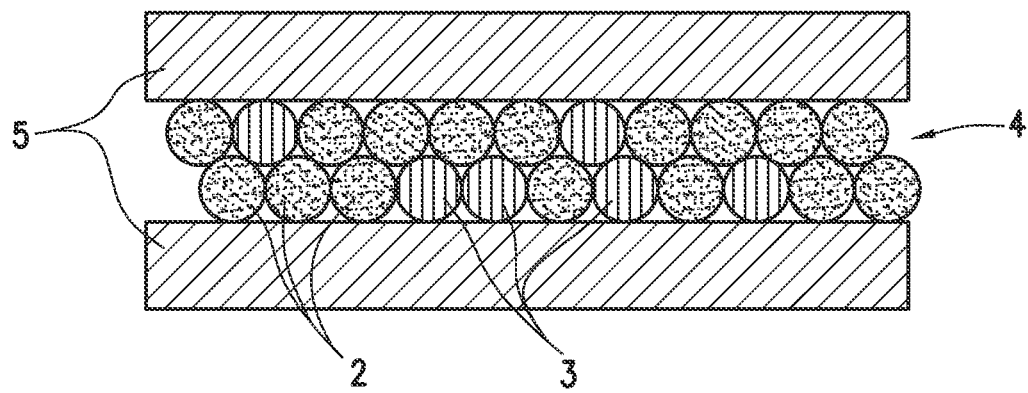
FIGS. 1A and 1B show illustrative schematics of an exemplary particulate pack containing a latent hydrofluoric acid composition before and after matrix degradation to form hydrofluoric acid.

The present disclosure generally relates to subterranean stimulation operations and, more specifically, to treatment fluids and methods for acidizing a siliceous material.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, the high reactivity of siliceous minerals toward hydrofluoric acid can make it very difficult to introduce permeability-enhancing features to these substances under typical acidizing conditions. The frequent low permeability and relatively homogeneous character of siliceous minerals may also be problematic in this regard. Although fracturing of the formation matrix may address low permeability values, the native lithology and inherent chemical reactivity of siliceous minerals may be much more difficult to overcome in order to enhance their permeability further. Even when a fracture network is in place in a siliceous mineral, dissolution may remain largely confined to the near-wellbore region due to the high reaction rate of hydrofluoric acid, thereby precluding stimulation at locations more removed from the wellbore. It can be particularly difficult to expand fractures within the fracture network of a siliceous mineral through conventional acidizing operations, especially upon setting of a proppant pack to maintain the fractures in an open state.

Lowering the reaction rate of hydrofluoric acid with a siliceous material might facilitate, in principle, deeper penetration of the hydrofluoric acid into the formation matrix during an acidizing operation. Although hydrofluoric acid precursors may be used to generate hydrofluoric acid in situ and thereby slow the dissolution rate of siliceous materials based largely on the kinetics of hydrofluoric acid production, they, by themselves, may provide little resolution for overcoming the native chemistry and lithology issues of siliceous materials in order to promote their non-uniform dissolution. Many hydrofluoric acid precursors are highly soluble under typical acidizing conditions, and it can be exceedingly difficult to localize the precursor upon a particular portion of a siliceous material as a result (e.g., within the fractures of a fracture network). Instead, convective transport occurs during delivery of the hydrofluoric acid precursor to a siliceous material, thereby diluting the precursor in the process and preventing any particular precursor localization from being realized. Accordingly, localized dissolution of a siliceous material resulting from deep penetration of hydrofluoric acid into a siliceous material during conventional acidizing operations may remain largely precluded, and the dissolution process may remain largely uniform as a result.

To address the foregoing issues, the present inventors discovered facile techniques whereby a hydrofluoric acid precursor may be localized proximate to a portion of a siliceous material without undergoing appreciable convective dissolution during its delivery downhole. Once the hydrofluoric acid precursor has been localized, it may be decomposed to form hydrofluoric acid, which may then affect differential dissolution of the siliceous material. The differential dissolution of the siliceous material may increase its permeability, similar to that seen during acidizing of a carbonate material. In particular, the inventors discovered facile techniques whereby a hydrofluoric acid precursor may be localized within a particulate pack, such as a proppant pack or a gravel pack, in order to affect localized dissolution of a siliceous material proximate to the particulate pack. Additional benefits may also be realized by incorporating a hydrofluoric acid precursor within a particulate pack, as discussed further hereinbelow.

Particulate packs may serve a variety of functions during subterranean treatment operations. Gravel packs include gravel particulates and are frequently disposed in a wellbore adjacent to the termini of a fracture network. A primary function of gravel packs is to occlude the passage of fine particulate materials from a fracture network or other portion of a subterranean formation and to prevent their subsequent production from the wellbore. Proppant packs include proppant particulates and are disposed within at least a portion of the fractures within a fracture network. A primary function of proppant packs is to prevent expanded fractures from fully closing under closure stress (i.e., once hydraulic fracturing pressure is released). Both gravel packs and proppant packs may be configured to maintain sufficient permeability for allowing passage of desired wellbore fluids therethrough, while still performing their intended function(s). Unless referenced more specifically herein, the term "particulates" will be understood to refer to either of "gravel particulates" or "proppant particulates."

More specifically, the present inventors discovered that a hydrofluoric acid precursor may be protected within a degradable matrix to form a latent hydrofluoric acid composition that is neutrally or positively buoyant. The latent hydrofluoric acid composition may be readily incorporated within a treatment fluid as a result of its buoyancy properties. A plurality of particulates may also be incorporated within the treatment fluid in combination with the latent hydrofluoric acid composition, thereby allowing the treatment fluid to be used for setting a particulate pack containing the particulates and the latent hydrofluoric acid composition. The particulate pack may be set as a gravel pack in the wellbore itself or as a proppant pack within the subterranean formation penetrated by the wellbore. When set as a proppant pack, release of the hydraulic fracturing pressure and partial closure of the fractures may promote confinement of the latent hydrofluoric acid composition and associated particulates therein. In either case, the degradable matrix may protect the hydrofluoric acid precursor during its transit within the treatment fluid (e.g., by forming a full or partial coating upon the hydrofluoric acid precursor), thereby precluding a substantial reaction from occurring to form hydrofluoric acid prior to setting of the particulate pack. Afterward or concurrently with setting of the particulate pack containing the latent hydrofluoric acid composition, the degradable matrix may then undergo degradation to expose at least a portion of the hydrofluoric acid precursor to conditions that affect its conversion into hydrofluoric acid. Degradation of the degradable matrix may be induced by a degradant, such as an acid, or occur passively. The hydrofluoric acid generated during this process has a high effective concentration within the particulate pack and can undergo a localized reaction in proximity to the particulate pack by virtue of the hydrofluoric acid's high reactivity. For example, hydrofluoric acid generated within a proppant pack may promote expansion of fractures in which the latent hydrofluoric acid composition is deposited, rather than diffusing out of the fractures before a reaction takes place. As referenced above, the inventors discovered that including a latent hydrofluoric acid composition of the present disclosure within a particulate pack can provide several advantages. Foremost, inclusion of the latent hydrofluoric acid composition within the particulate pack can allow differential dissolution of a siliceous material to be realized. Without being bound by theory or mechanism, it is believed that the other particulates within a particulate pack can help maintain or confine the hydrofluoric acid in a relatively localized position following its generation from the hydrofluoric acid precursor, thereby allowing the hydrofluoric acid to undergo a directed reaction with a siliceous material. Although a latent hydrofluoric acid composition of the present disclosure may similarly promote dissolution without being localized in a particulate pack, as described in commonly owned U.S. patent application Ser. No. 15/754,048 entitled "Methods, Treatment Fluids and Systems for Differential Acidizing of a Siliceous Material" and filed concurrently herewith, it appears that the dissolution process is enhanced when a particulate pack is utilized. Even when the other particulates comprising the particulate pack are themselves siliceous in nature, dissolution still surprisingly appears to be directed primarily toward the siliceous material comprising the formation matrix instead.

Further to the dissolution advantages noted above, incorporating the latent hydrofluoric acid composition within a particulate pack may desirably enhance the particulate pack itself. Specifically, upon degradation of the degradable matrix comprising the latent hydrofluoric acid composition, voids may be generated in the particulate pack, thereby increasing its permeability. Although the primary reaction of the generated hydrofluoric acid appears to be directed toward the proximate siliceous material, it is expected that some of the hydrofluoric acid may react with the particulates of the particulate pack and contribute to the porosity enhancement. In either case, the increased permeability of the particulate pack can better facilitate the production of desired wellbore fluids therethrough. Moreover, by modulating the quantity of the degradable matrix and/or the amount of hydrofluoric acid precursor that is present in the particulate pack, tailoring of the particulate pack permeability may be realized for accommodating the particular conditions present in a given subterranean environment. In some embodiments, the effects of scale formation within a particulate pack may be at least partially addressed by increasing the pack's permeability in accordance with the disclosure above.

In addition to promoting more effective stimulation of siliceous materials, the latent hydrofluoric acid compositions and related methods of the present disclosure may provide further advantages as well. From an operational standpoint, keeping the hydrofluoric acid in latent form may avert the handling and safety issues associated with direct use of this acid. Surface corrosion issues may similarly be avoided. In terms of the hydrofluoric acid precursor itself, encapsulation of the precursor within the degradable matrix may lessen potential dust inhalation hazards for operational personnel. Furthermore, a number of degradable matrices are available and may be chosen to tailor the degradation process to a particular set of wellbore conditions that may be present. Similarly, as discussed above, modulating the amount of degradable matrix that is present may allow tailoring of the permeability of a particulate pack may be realized. Finally, the disclosure herein is fully compatible with existing technologies for mitigating re-precipitation of siliceous materials following their dissolution. Further disclosure in regard to the foregoing follows below.

In various embodiments, treatment fluids for setting a particulate pack comprising a latent hydrofluoric acid composition are described herein. The treatment fluids may comprise an aqueous carrier fluid, a plurality of particulates, and a latent hydrofluoric acid composition present in a solid form in the aqueous carrier fluid. The latent hydrofluoric acid composition may comprise a degradable matrix and a hydrofluoric acid precursor dispersed in the degradable matrix. In some embodiments, the degradable matrix may form a full or partial coating upon the hydrofluoric acid precursor. In some embodiments, the degradable matrix may be continuous, rather than being in the form of discrete particles.

Suitable aqueous carrier fluids may include, for example, fresh water, treated water, recycled water, ground water, flowback water, produced water, brackish water, acidified water, salt water, seawater, brine (e.g., a saturated salt solution), or an aqueous salt solution (e.g., a non-saturated salt solution). Aqueous carrier fluids may be obtained from any suitable source. Given the benefit of the present disclosure, one of ordinary skill in the art will be able to determine an appropriate aqueous carrier fluid and amount thereof for utilization in the embodiments described herein.

In some embodiments, the aqueous carrier fluid may be chosen such that it is substantially free of alkali metal ions. For purposes of this disclosure, an aqueous carrier fluid or a treatment fluid formed therefrom will be considered to be substantially free of alkali metal ions if less than about 1 wt. % alkali metal ions are present. Choice of an aqueous carrier fluid that is substantially free of alkali metal ions may be desirable in order to limit re-precipitation of alkali metal aluminosilicates, fluorosilicates, and fluoroaluminates following dissolution of a siliceous material. Other features and considerations that may be utilized to mitigate re-precipitation issues following dissolution of a siliceous material are discussed further hereinbelow.

In some embodiments, an organic co-solvent may be included with an aqueous carrier fluid. Suitable organic co-solvents may be miscible with the aqueous carrier fluid and include solvents such as, but not limited to, glycols and alcohols. When present, the amount of the organic co-solvent may range between about 1% to about 50% by volume of the treatment fluid. Considerations for including an organic co-solvent along with an aqueous carrier fluid may include, for example, precluding solubility of the latent hydrofluoric acid composition.

Depending on the type of particulate pack to be set by the treatment fluid, the plurality of particulates that is present in the aqueous carrier fluid may comprise proppant particulates or gravel particulates. Although these particulates may bear some similarities to one another, as discussed further below, they may vary in size or other features depending upon the location where they are to be deposited.

Proppant particulates suitable for use in the various embodiments of the present disclosure are not believed to be particularly limited. Illustrative proppant particulates that may be used in conjunction with the embodiments described herein include, for example, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof. The mean particulate size of the proppant particulates generally may range from about 2 mesh to about 400 mesh on the U.S. Sieve Series, although other sizes or mixtures of sizes may be desirable in certain embodiments. The proppant particulates may be substantially spherical materials, fibrous materials, polygonal materials (such as cubic materials), irregular shapes, and any combination thereof.

Gravel particulates suitable for use in conjunction with the present disclosure are similarly not believed to be particularly limited and may include the various materials comprising proppant particulates described in more detail above. As used herein, the term "gravel" will refer to both natural gravel and other proppant-like particulate materials, including natural and synthetic materials. As used herein, the term "natural gravel" will refer to a collection of stones, pebbles or fragments thereof having equivalent spherical diameters ranging between about 4 mm and about 120 mm, possibly present in combination with other formation materials, such as sand. It is to be recognized, however, that suitable gravel particulates (both natural and/or synthetic) may have sizes that are outside this range, either larger or smaller, depending on the conditions present in a particular wellbore.

Suitable degradable matrices and their degradation mechanisms are not believed to be particularly limited. For example, in various embodiments, the degradable matrix may degrade under particular pH conditions, oxidative conditions, photolytic conditions, biological conditions, dissolution conditions, or the like. For purposes of this disclosure, dissolution of an initially insoluble material will be considered to constitute degradation. Particular pH conditions may entail acidic conditions or basic conditions depending upon the chosen degradable matrix. In some embodiments, it may be advantageous for the degradable matrix to be acid-degradable, since the degradable matrix may undergo at least partial degradation and the hydrofluoric acid precursor may be converted into hydrofluoric acid under a single set of pH conditions. Particular acid-degradable matrices are discussed hereinbelow.

In some embodiments, the degradable matrix may comprise a degradable polymer. Degradable polymers that may be used in conjunction with the various embodiments of the present disclosure include, for example, polysaccharides, proteins, polyesters (particularly aliphatic polyesters), poly(hydroxyalkanoates), poly(β-hydroxyalkanoates), poly(ω-hydroxy alkanoates), polylactides, polyglycolides, poly(ε-caprolactone)s, poly(hydroxybutyrate)s, poly(alkylene dicarboxylates), polyanhydrides, poly(hydroxy ester ether)s, poly(ether ester)s, poly(ester amide)s, polycarbamates (i.e., polyurethanes), polycarbonates, poly(orthoester)s, poly(amino acid)s, poly(ethylene oxide), polyphosphazenes, polyvinyl alcohol, methyl cellulose, ethyl cellulose, carboxymethyl cellulose, carboxyethyl cellulose, acetyl cellulose, hydroxyethyl cellulose, shellac, dextran, guar, xanthan, starch, a scleroglucan, a diutan, poly(vinyl pyrrolidone), polyacrylamide, polyacrylic acid, poly(diallyldimethylammonium chloride), poly(ethylene glycol), polylysine, polymethacrylamide, polymethacrylic acid, poly(vinylamine), any derivative thereof, any copolymer thereof, any salt thereof, and any combination thereof. Copolymers may include random, block, graft, and/or star copolymers in various embodiments.

In more particular embodiments, the degradable polymer may comprise an acid-degradable polymer. In some embodiments, a suitable acid-degradable polymer may comprise a polylactide or an aliphatic polyester. In still more particular embodiments, a suitable acid-degradable polymer may comprise polylactic acid, any derivative thereof, or any combination thereof. The polylactic acid may be of the L-configuration, the D-configuration, or any combination thereof, and the chosen configuration may impact the degradation rate of the degradable matrix. Without being bound by theory or mechanism, the configuration or mixture of configurations of the lactic acid monomers in the polylactic acid may impact the polymer's crystallinity, which may, in turn, affect the degradation rate of the degradable matrix. Combinations of the L- and D-configurations may comprise a racemic mixture, or one configuration may be present in excess over the other. The degradation rate may also be a function of the temperature conditions to which the polylactic acid is exposed. Polylactic acid may be especially advantageous in the context of the present disclosure, since it may help suppress re-precipitation of dissolved silicon compounds by at least partially complexing dissolved metal ions produced upon dissolution of a siliceous material.

In some embodiments, a dehydrated compound may comprise at least a portion of the degradable matrix by slowly hydrating over time and becoming soluble, thereby exposing the hydrofluoric acid precursor in a similar manner to that described above. Dehydrated borates represent illustrative examples of dehydrated compounds that may be used in this regard. Illustrative dehydrated borates can include, for example, anhydrous sodium tetraborate (anhydrous borax) and anhydrous boric acid. These anhydrous borates and others are only slightly soluble in water. However, upon exposure to subterranean temperatures, they can slowly rehydrate and become considerably more soluble over a timeframe of about 8 hours to about 72 hours, depending upon the temperature. In some embodiments, a dehydrated compound may be used in combination with a degradable polymer, a non-degradable polymer or any combination thereof in the degradable matrix in order to convey adequate protection to the hydrofluoric acid-generating compound and to tailor the degradation rate. For example, the polymer may protect the hydrofluoric acid precursor from undergoing a premature reaction, and the solubilization of the dehydrated compound may promote exposure of the hydrofluoric acid precursor to conditions that affect its conversion to hydrofluoric acid.

In some embodiments, an oil-soluble material may comprise at least a portion of the degradable matrix by slowly dissolving over time following exposure to a formation fluid, thereby exposing the hydrofluoric acid precursor in a similar manner to that described above. Suitable oil-soluble materials that may be used in conjunction with the embodiments of the present disclosure include, for example, poly(butadiene), polyisoprene, polyacrylics, polyamides, polyether urethanes, polyester urethanes, and polyolefins (e.g., polyethylene, polypropylene, polyisobutylene, and polystyrene), any copolymer thereof, and any combination thereof.

In various embodiments, a loading of the hydrofluoric acid precursor in the degradable matrix may range between about 1% and about 50% by weight of the latent hydrofluoric acid composition. In more specific embodiments, a loading of the hydrofluoric acid precursor may be between about 5% and about 25% by weight of the latent hydrofluoric acid composition, or between about 5% and about 15% by weight of the latent hydrofluoric acid composition, or between about 1% and about 15% by weight of the latent hydrofluoric acid composition, or between about 1% and about 10% by weight of the latent hydrofluoric acid composition, or between about 5% and about 10% by weight of the latent hydrofluoric acid composition. Another consideration for determining a quantity of the degradable matrix to include in the latent hydrofluoric acid composition, consequently influencing the loading of the hydrofluoric acid precursor, may include the extent to which one wants to increase the porosity of a particulate pack following degradation of the degradable matrix. A loading of the latent hydrofluoric acid composition in the treatment fluid, in turn, may be chosen based upon the amount of the latent hydrofluoric acid composition that needs to be deposited in a given treatment operation in order to accomplish its intended function.

In principle, any hydrofluoric acid precursor can be incorporated within the degradable matrix of the latent hydrofluoric acid composition. In this regard, hydrofluoric acid precursors that may be utilized in the various embodiments of the present disclosure include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, titanium fluorides (e.g., $TiF_4$ and $TiF_6^{2-}$), cesium fluoride, boron trifluoride and various boron trifluoride complexes.

In more particular embodiments of the present disclosure, the hydrofluoric acid precursor may comprise a solid material, such as any solid hydrofluoric acid precursor(s) selected from the listing above. Solid hydrofluoric acid precursors may be readily dispersed in the degradable matrix of the latent hydrofluoric acid composition and be substantially protected from undergoing a premature reaction to form hydrofluoric acid. Moreover, under most circumstances, the rheological and buoyancy properties of the latent hydrofluoric acid composition may be determined in substantial part by the properties of the degradable matrix itself in such embodiments, rather than by the hydrofluoric acid precursor. Particularly suitable solid hydrofluoric acid precursors may include, for example, ammonium bifluoride or ammonium fluoride, since these hydrofluoric acid precursors are readily soluble in aqueous fluids and quickly generate hydrofluoric acid upon exposure to an aqueous acid. In addition, these hydrofluoric acid precursors do not contain any elements that represent significant environmental concerns or could lead to potential secondary formation damage.

In alternative embodiments, the latent hydrofluoric acid composition may comprise a liquid hydrofluoric acid precursor or a gaseous hydrofluoric acid precursor. Protection of both of these types of hydrofluoric acid precursors by the degradable matrix may be more difficult than for solid hydrofluoric acid precursors, since liquid or gaseous hydrofluoric acid precursors may be more difficult to isolate from conditions that would otherwise promote their solubilization and/or conversion into hydrofluoric acid.

In some embodiments, the treatment fluid may be foamed in order to promote delivery of the latent hydrofluoric acid composition and other particulates used in setting the particulate pack. Foaming the treatment fluid may minimize settling or loss of these materials at an undesired location. Additionally, foaming the treatment fluid may allow lower treatment fluid volumes to be utilized than would otherwise be possible.

In other various embodiments, the treatment fluids of the present disclosure may comprise a gelling agent. Gelling the treatment fluid, such as through use of a gelled polymer, may likewise facilitate transport of the latent hydrofluoric acid composition and particulates used for setting the particulate pack. Suitable gelling agents are not believed to be particularly limited and may comprise materials such as, for example, crosslinkable polysaccharides, synthetic polymer gelling agents or viscoelastic surfactants. The concentration of the gelling agent in the treatment fluid may range between about 0.1% and about 10% by weight of the treatment fluid and may be selected to provide a desired degree of viscosification for transport of the latent hydrofluoric acid composition and the particulates. Suitable crosslinking agents may include various transition metal ions (e.g., zirconium ions, titanium ions, chromium ions, and the like), main group metal ions (e.g., calcium ions, magnesium ions, and antimony ions), borate ions, crosslinking polymers, and the like. Likewise, the concentration of the crosslinking agent in the treatment fluid may range between about 0.005% and about 1% by weight of the treatment fluid and may be selected to provide a desired degree of viscosification.

In additional embodiments, the treatment fluids described herein may further comprise any number of additives that are commonly used in downhole operations including, for example, silica scale control additives, chelating agents, surfactants, gel stabilizers, anti-oxidants, polymer degradation prevention additives, relative permeability modifiers, scale inhibitors, foaming agents, defoaming agents, anti-foaming agents, emulsifying agents, de-emulsifying agents, iron control agents, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Any combination of these additives may be used as well. Particularly suitable additives for inclusion in the treatment fluids may include those which can mitigate re-precipitation following dissolution of a siliceous material, such as silica scale control additives, chelating agents, and the like. Further disclosure in this regard follows hereinbelow. Given the benefit of the present disclosure, one having ordinary skill in the art will be able to formulate a treatment fluid having properties suitable for a given application.

In more particular embodiments, the treatment fluids described herein may further comprise an acid, an acid-generating compound, or any combination thereof. Inclusion of an acid or an acid-generating compound may be desirable, even when the degradable matrix of the latent hydrofluoric acid composition is acid-degradable, such as an acid-degradable polymer. Under such conditions, the acid-degradable matrix, a concentration of the acid, and/or a degradation rate to form the acid, for example, may be selected such that the degradable matrix remains intact long enough to set a particulate pack with the treatment fluid.

Particular examples of acids suitable for inclusion in the treatment fluid containing the latent hydrofluoric acid composition and/or a second treatment fluid utilized separately from the latent hydrofluoric acid composition may include, but are not limited to, hydrochloric acid, hydrobromic acid, formic acid, acetic acid, chloroacetic acid, dichloroacetic acid, trichloroacetic acid, fluoroacetic acid, difluoroacetic acid, trifluoroacetic acid, methanesulfonic acid, citric acid, maleic acid, glycolic acid, lactic acid, malic acid, oxalic acid, the like, and any combination thereof. Examples of suitable acid-generating compounds may include, but are not limited to, esters, aliphatic polyesters, orthoesters, poly (orthoesters), poly(lactides), poly(glycolides), poly($\varepsilon$-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combination thereof.

The particular acid-degradable material comprising the degradable matrix may dictate the chosen acid or acid-generating compound and its concentration. Mineral acids may be present in the treatment fluids in an amount ranging between about 1% and about 20% of the treatment fluid by weight, or in an amount ranging between about 1% and about 15% of the treatment fluid by weight, or in an amount ranging between about 5% and about 10% of the treatment fluid by weight. Higher mineral acid concentrations may be used as well. Since organic acids are generally less acidic than are mineral acids, organic acids may comprise up to about 25% of a treatment fluid by weight, particularly between about 1% and about 25% of the treatment fluid by weight, or between about 10% and about 20% of the treatment fluid by weight. Acid-generating compounds may be used to produce acids at similar concentration values. The treatment fluids can have a pH value of about 4 or lower, or about 3.5 or lower, or about 3 or lower, or about 2.5 or lower, or about 2 or lower, or about 1.5 or lower, or about 1 or lower. In more particular embodiments, the pH may range between about 0 and about 4, or between about 1 and about 4, or between about 1 and about 3, or between about 2 and about 4.

Methods for acidizing a subterranean formation using the latent hydrofluoric acid compositions of the present disclosure are also contemplated herein. More specifically, the methods of the present disclosure may set a particulate pack comprising the latent hydrofluoric acid composition, and hydrofluoric acid may be generated from the particulate pack upon degradation of the degradable matrix. As discussed above, the generated hydrofluoric acid may react with a siliceous material in proximity to the particulate pack, and degradation of the degradable matrix may desirably further increase the porosity of the particulate pack itself. Particularly when the particulate pack is set within a fracture network of a siliceous material, a deeper penetration of hydrofluoric acid within the formation matrix may be realized than would otherwise be possible without utilizing the latent hydrofluoric acid composition. Additional disclosure in this regard follows below.

In some embodiments, methods of the present disclosure may comprise: providing a latent hydrofluoric acid composition comprising a degradable matrix, and a hydrofluoric acid precursor dispersed in the degradable matrix; setting a particulate pack in a wellbore or in a subterranean formation comprising a siliceous material that is penetrated by the wellbore, the particulate pack comprising particulates and a solid form of the latent hydrofluoric acid composition; degrading at least a portion of the degradable matrix, thereby exposing at least a portion of the hydrofluoric acid precursor; converting the exposed hydrofluoric acid precursor into hydrofluoric acid; and reacting the hydrofluoric acid with the siliceous material adjacent to a location in the particulate pack where the latent hydrofluoric acid composition was present.

Figure 1B:
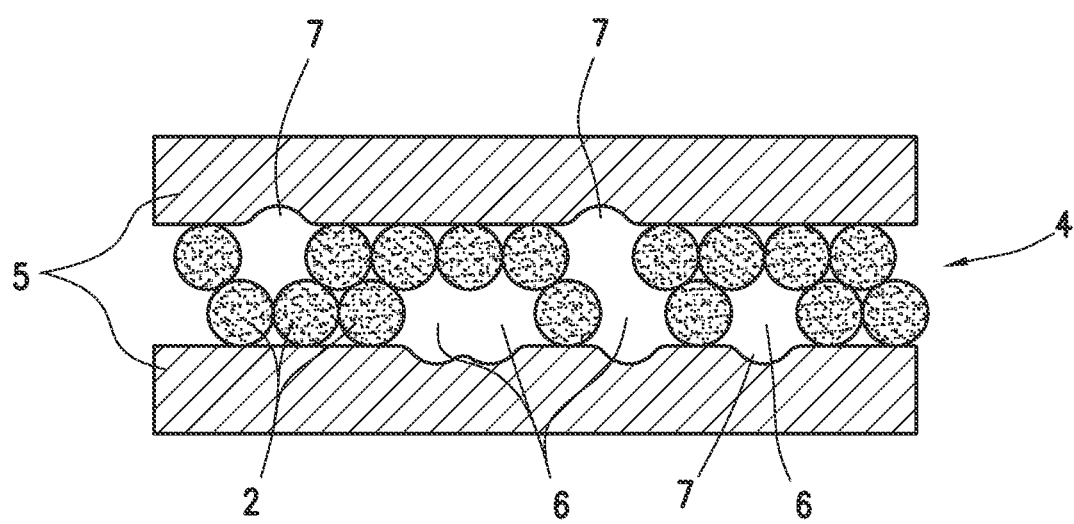

FIGS. 1A and 1B show illustrative schematics of an exemplary particulate pack containing a latent hydrofluoric acid composition before and after matrix degradation to form hydrofluoric acid. As shown in FIG. 1A, particulates 2 and latent hydrofluoric acid composition 3 occupy fracture 4 within siliceous matrix 5. The depicted random disposition of latent hydrofluoric acid composition 3 within fracture 4 should not be considered limiting. Upon degradation of the degradable matrix and concurrent or near-concurrent generation of hydrofluoric acid, voids 6 replace the positions in the particulate pack where latent hydrofluoric acid composition 3 was originally present, as shown in FIG. 1B. Additional etching 7 of siliceous matrix 5 also may occur adjacent to the locations where latent hydrofluoric acid composition 3 was originally present.

In some embodiments of the present disclosure, the siliceous material may be present in a reservoir comprising a mineral such as shale, sandstone, mudstone or any combination thereof, which may be present in the formation matrix. In some embodiments, the subterranean formation may comprise a low-permeability variant of these minerals or another type of siliceous mineral. As used herein, the term "low-permeability" will refer to a mineral whose native permeability is about 1 millidarcy or below.

The particulate pack may be deposited in the wellbore or in the subterranean formation itself depending upon the conditions under which a treatment fluid containing the latent hydrofluoric acid composition is introduced into the wellbore. In some embodiments, the treatment fluid may be introduced into the wellbore below a fracture gradient pressure of the subterranean formation, and the latent hydrofluoric acid composition and at least a portion of the plurality of particulates may be deposited as a gravel pack within the wellbore itself (e.g., within the wellbore annulus, held in place with suitable screens). One having ordinary skill in the art will be able to determine a fracture gradient pressure characteristic of a given type of subterranean formation.

In other various embodiments, the treatment fluid may be introduced into the wellbore at or above a fracture gradient pressure of the subterranean formation, and the latent hydrofluoric acid composition and at least a portion of the plurality of particulates may be deposited as a proppant pack within a fracture network of the subterranean formation itself. Under such conditions, any fractures present in an existing fracture network of the siliceous material can at least temporarily expand, thereby allowing entry thereto of the latent hydrofluoric acid composition and a least a portion of the particulates contained in the treatment fluid. Any newly generated fractures in the siliceous material may similarly receive the latent hydrofluoric acid composition and particulates from the wellbore. The expanded fractures may partially close upon release of the hydraulic fracturing pressure but remain held open by the particulates and/or the latent hydrofluoric acid composition. Partial closure of the fractures may effectively trap the latent hydrofluoric acid composition and particulates within the fractures and set the particulate pack. In some embodiments, any residual latent hydrofluoric acid composition and/or particulates remaining in the wellbore may be removed in an overflush, thereby further localizing the latent hydrofluoric acid composition with respect to the siliceous material.

In alternative embodiments, a pad fluid may precede a treatment fluid containing the latent hydrofluoric acid composition and particulates. The pad fluid may also be introduced to the wellbore at or above the fracture gradient pressure. As used herein, the term "pad fluid" will refer to a proppant-free treatment fluid that is introduced to a wellbore prior to a larger volume of treatment fluid containing proppant particulates or a similar type of particulate material. Once fractures in the siliceous material have been created or extended with the pad fluid, the treatment fluid containing the latent hydrofluoric acid composition and particulates may then be introduced to set the particulate pack within the fractures, as described hereinabove.

After depositing the latent hydrofluoric acid composition within the particulate pack, hydrofluoric acid may be generated from the latent hydrofluoric acid composition to promote at least partial dissolution of the siliceous material. Depending on the location of the particulate pack, dissolution of the siliceous material may comprise fracture face etching and/or expansion of fractures defined within the siliceous material. In addition, as discussed above, degradation of the degradable matrix may concurrently increase the porosity of the particulate pack, which may be desirable from several standpoints.

Generation of hydrofluoric acid from the latent hydrofluoric acid composition may comprise first degrading at least a portion of the degradable matrix to expose at least a portion of the hydrofluoric acid precursor to a reactive environment (e.g., an acid or other conditions capable of converting the hydrofluoric acid precursor into hydrofluoric acid). As discussed above, in some embodiments, the degradable matrix may comprise an acid-degradable matrix, such as an acid-degradable polymer. Specific examples of acid-degradable polymers are provided above. Accordingly, in certain embodiments, degrading the degradable matrix may comprise contacting an acid-degradable polymer in the degradable matrix with an aqueous acid. An acid-generating compound may be used similarly in this regard. The aqueous acid may comprise any organic or mineral acid that is present in a concentration suitable to degrade the acid-degradable polymer at a chosen rate.

The methods of the present disclosure allow considerable flexibility to be realized in how an acid is contacted with an acid-degradable polymer or other acid-degradable matrix. In some embodiments, methods of the present disclosure may comprise introducing a first treatment fluid into the wellbore, in which the first treatment fluid comprises an acid, an acid-generating compound or any combination thereof, a plurality of the particulates, and the solid form of the latent hydrofluoric acid composition. The acid or generated acid may promote degradation of the acid-degradable polymer and ensuing conversion of the exposed hydrofluoric acid precursor into hydrofluoric acid. Although it might seem counterintuitive to include an acid source in the same treatment fluid with an acid-degradable polymer or other acid-degradable matrix, the acid-degradable polymer or matrix may persist long enough after being combined with the acid such that the latent hydrofluoric acid composition can still be delivered downhole effectively and set into a particulate pack. The acid concentration and the particular acid-degradable polymer or matrix, for example, may be chosen to maintain a suitable degradation rate for subterranean delivery under a particular set of downhole and pH conditions. Among other factors, the temperature of the subterranean formation, for example, may be taken into account when assessing the degradation rate under a particular set of conditions. Inclusion of an acid or an acid-generating compound in a first treatment fluid in combination with the latent hydrofluoric acid composition may limit the number of treatment stages needing to be performed, thereby helping to limit costs of the acidizing operation.

In alternative embodiments, methods of the present disclosure may further comprise introducing a second treatment fluid comprising an acid, an acid-generating compound, or any combination thereof into the wellbore after setting the particulate pack with a first treatment fluid. Utilization of a second treatment fluid to induce degradation of the degradable matrix may be desirable when a more lengthy delay is needed for releasing hydrofluoric acid than can be realized by including an acid or an acid-generating compound in a first treatment fluid containing the latent hydrofluoric acid composition. Accordingly, in some embodiments, the particulate pack may be set with a first treatment fluid, such as a treatment fluid comprising a brine-based carrier fluid, and the particulate pack may then be overflushed with a second treatment fluid comprising an acid or an acid-generating compound in order to induce degradation of the degradable matrix.

Accordingly, in more specific embodiments of the present disclosure, methods for setting a particulate pack, particularly a proppant pack, may comprise: introducing a first treatment fluid comprising a plurality of particulates and a latent hydrofluoric acid composition into a wellbore penetrating a subterranean formation comprising a siliceous material, the latent hydrofluoric acid composition being present in a solid form in the first treatment fluid and comprising an acid-degradable matrix, and a hydrofluoric acid precursor dispersed in the acid-degradable matrix; setting a proppant pack within a fracture network defined in the siliceous material, the proppant pack comprising at least a portion of the plurality of particulates and the solid form of the latent hydrofluoric acid composition; contacting the proppant pack with an acid, thereby degrading at least a portion of the acid-degradable matrix, exposing at least a portion of the hydrofluoric acid precursor, and converting the exposed hydrofluoric acid precursor into hydrofluoric acid; and reacting the hydrofluoric acid with the siliceous material adjacent to a location in the proppant pack where the latent hydrofluoric acid composition was present.

As one of ordinary skill in the art will recognize and as referenced in brief above, various issues with re-precipitation can be encountered in the course of acidizing a siliceous material. Without limitation, issues that can be encountered include re-precipitation of siliceous compounds once the solubility limit of dissolved silicon has been exceeded, formation of highly insoluble alkali metal fluorosilicates or alkali metal fluoroaluminates in the presence of alkali metal ions, formation of calcium fluoride, and any combination thereof. Depending on the actual conditions present in a given subterranean formation, a particular re-precipitation pathway may be predominant. Illustrative strategies to address these precipitation issues are discussed in brief hereinafter, each of which is compatible for use in conjunction with the latent hydrofluoric acid compositions described herein. Other precipitation-control strategies may also be appropriate and compatible with the latent hydrofluoric acid composition, and the listed strategies should be considered to be non-limiting examples of those that may be employed.

In some embodiments, a silica scale control additive may be used in conjunction with the latent hydrofluoric acid composition. As used herein, the term "silica scale control additive" will refer to a substance that limits deposition of amorphous, gelatinous and/or colloidal silica that leads to silica scale buildup. Illustrative silica scale control additives that may be used in this regard include, but are not limited to, polyaminoamide dendrimers, polyethyleneimine, carboxymethylinulin, polyacrylates, phosphonates, aminocarboxylic acids, polyaminocarboxylic acids, and ortho-dihydroxybenzene compounds related to tannic acid. When used, a silica scale control additive may be present in a first treatment fluid in combination with the latent hydrofluoric acid composition or in a treatment fluid introduced to the wellbore separately from the latent hydrofluoric acid composition.

In many instances, a carbonate material may be present in conjunction with a siliceous material in a subterranean formation. For example, sandstone deposits may contain about 1% to about 35% carbonates in addition to the predominant siliceous material. Upon dissolution, the carbonate material can provide metal ions that may lead to precipitation, either by themselves or in the presence of fluoride ions from hydrofluoric acid. For example, calcium ions can react readily with fluoride ions to form highly insoluble and damaging calcium fluoride. Aluminum ions resulting from dissolution of aluminosilicates can also represent a troubling source of precipitation, particularly in the presence of alkali metal ions.

Accordingly, in some embodiments, a chelating agent may be used in conjunction with the latent hydrofluoric acid composition. The chelating agent may complex metal ions and render them inactive such that they are no longer able to react to form insoluble compounds. As used herein, the terms "complex," "complexing," "complexation" and other grammatical variants thereof will refer to the formation of a metal-ligand bond. Although complexation of a metal ion may involve a chelation process in some embodiments, complexation is not deemed to be limited in this manner. When used, a chelating agent may be present in a first treatment fluid in combination with the latent hydrofluoric acid composition or in a treatment fluid introduced to the wellbore separately from the latent hydrofluoric acid composition. Aminopolycarboxylic acid chelating agents may be particularly advantageous chelating agents for use in the embodiments disclosed herein.

In other various embodiments, systems configured for delivering a treatment fluid of the present disclosure to a downhole location are described herein. In various embodiments, the systems can comprise a pump fluidly coupled to a tubular, the tubular containing a treatment fluid comprising an aqueous carrier fluid, a plurality of particulates, and a latent hydrofluoric acid composition present in a solid form in the aqueous carrier fluid. The latent hydrofluoric acid composition may comprise a degradable matrix and a hydrofluoric acid precursor dispersed in the degradable matrix. In some embodiments, the treatment fluid may further comprise an acid, an acid-generating compound, or any combination thereof.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a treatment fluid of the present disclosure to a subterranean formation at or above a fracture gradient of the subterranean formation, but it may also be used in cases where fracturing is not desired. The treatment fluids described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of a treatment fluid before it reaches the high pressure pump. Alternately, the low pressure pump may be used to directly introduce the treatment fluid to the subterranean formation.

In some embodiments, the systems described herein can further comprise a mixing tank that is upstream of the pump and in which the latent hydrofluoric acid composition is formulated with a carrier fluid. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
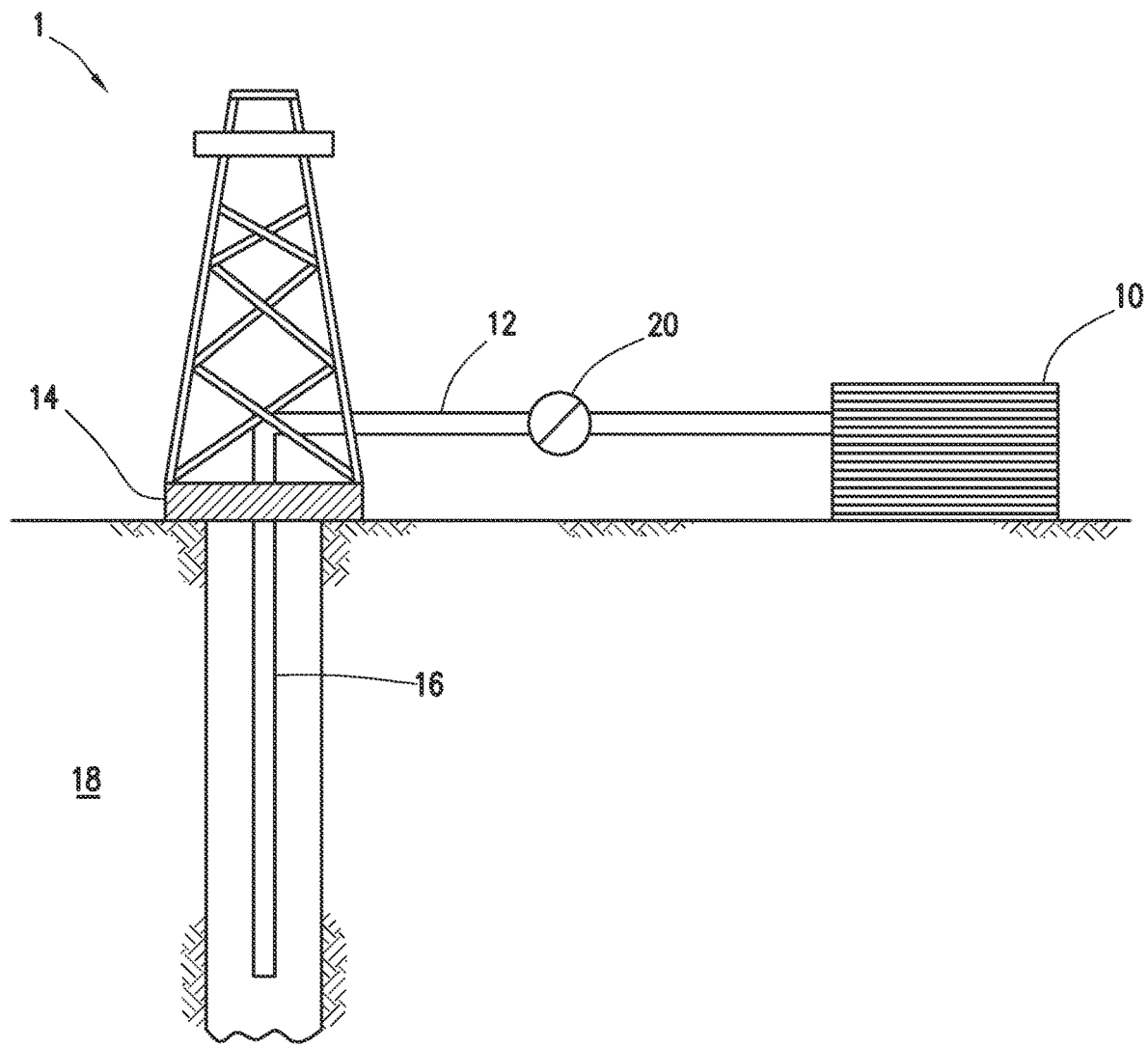
FIG. 2 shows an illustrative schematic of a system that can deliver treatment fluids of the present disclosure to a downhole location, according to one or more embodiments.

FIG. 2 shows an illustrative schematic of a system that can deliver treatment fluids of the present disclosure to a downhole location, according to one or more embodiments. It should be noted that while FIG. 2 generally depicts a land-based system, it is to be recognized that like systems may be operated in subsea locations as well. For example, the treatment fluid may be delivered to the downhole location of a subsea wellbore using a subsea riser structure. As depicted in FIG. 2, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the treatment fluid to enter into the wellbore. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

Embodiments disclosed herein include:

A. Methods for setting a particulate pack in a wellbore containing a siliceous material. The methods comprise: providing a latent hydrofluoric acid composition comprising a degradable matrix, and a hydrofluoric acid precursor dispersed in the degradable matrix; setting a particulate pack in a wellbore or in a subterranean formation comprising a siliceous material that is penetrated by the wellbore, the particulate pack comprising particulates and a solid form of the latent hydrofluoric acid composition; degrading at least a portion of the degradable matrix, thereby exposing at least a portion of the hydrofluoric acid precursor; converting the exposed hydrofluoric acid precursor into hydrofluoric acid; and reacting the hydrofluoric acid with the siliceous material adjacent to a location in the particulate pack where the latent hydrofluoric acid composition was present.

B. Methods for setting a proppant pack within a siliceous material. The methods comprise: introducing a first treatment fluid comprising a plurality of particulates and a latent hydrofluoric acid composition into a wellbore penetrating a subterranean formation comprising a siliceous material, the latent hydrofluoric acid composition being present in a solid form in the first treatment fluid and comprising an acid-degradable matrix, and a hydrofluoric acid precursor dispersed in the acid-degradable matrix; setting a proppant pack within a fracture network defined in the siliceous material, the proppant pack comprising at least a portion of the plurality of particulates and the solid form of the latent hydrofluoric acid composition; contacting the proppant pack with an acid, thereby degrading at least a portion of the acid-degradable matrix, exposing at least a portion of the hydrofluoric acid precursor, and converting the exposed hydrofluoric acid precursor into hydrofluoric acid; and reacting the hydrofluoric acid with the siliceous material adjacent to a location in the proppant pack where the latent hydrofluoric acid composition was present.

C. Treatment fluids comprising a latent hydrofluoric acid composition. The treatment fluids comprise: an aqueous carrier fluid; a plurality of particulates; and a latent hydrofluoric acid composition present in a solid form in the aqueous carrier fluid, the latent hydrofluoric acid composition comprising a degradable matrix, and a hydrofluoric acid precursor dispersed in the degradable matrix.

D. Systems for introducing a latent hydrofluoric acid composition into a wellbore. The systems comprise: a pump fluidly coupled to a tubular, the tubular containing a treatment fluid comprising an aqueous carrier fluid, a plurality of particulates, and a latent hydrofluoric acid composition present in a solid form in the aqueous carrier fluid, the latent hydrofluoric acid composition comprising a degradable matrix, and a hydrofluoric acid precursor dispersed in the degradable matrix.

Each of embodiments A-D may have one or more of the following additional elements in any combination:

Element 1: wherein the degradable matrix is acid-degradable.

Element 2: wherein the degradable matrix comprises an acid-degradable polymer.

Element 3: wherein the acid-degradable polymer comprises polylactic acid, any derivative thereof, or any combination thereof.

Element 4: wherein the method further comprises introducing a first treatment fluid into the wellbore, the first treatment fluid comprising: an acid, an acid-generating compound, or any combination thereof; a plurality of the particulates; and the solid form of the latent hydrofluoric acid composition.

Element 5: wherein the method further comprises after setting the particulate pack with a first treatment fluid, introducing a second treatment fluid comprising an acid, an acid-generating compound, or any combination thereof into the wellbore.

Element 6: wherein the hydrofluoric acid precursor comprises a solid material.

Element 7: wherein the siliceous material is present in a reservoir comprising a mineral selected from the group consisting of shale, sandstone, mudstone, and any combination thereof.

Element 8: wherein the particulate pack comprises a proppant pack located within a fracture network defined in the siliceous material.

Element 9: wherein the latent hydrofluoric acid composition and a plurality of the particulates are introduced into the wellbore in a first treatment fluid at or above a fracture gradient pressure of the siliceous material.

Element 10: wherein the first treatment fluid further comprises the acid, an acid-generating compound, or any combination thereof.

Element 11: wherein the method further comprises after setting the proppant pack within the fracture network with the first treatment fluid, introducing a second treatment fluid comprising the acid, an acid-generating compound, or any combination thereof into the wellbore.

Element 12: wherein the first treatment fluid is introduced into the wellbore at or above a fracture gradient pressure of the siliceous material.

Element 13: wherein the treatment fluid further comprises an acid, an acid-generating compound, or any combination thereof.

By way of non-limiting example, exemplary combinations applicable to A-D include:

The method of A in combination with elements 2 and 4.
The method of A in combination with elements 2 and 5.
The method of A in combination with elements 2 and 6.
The method of A in combination with elements 1 and 7.
The method of A in combination with elements 4 and 7.
The method of A in combination with elements 5 and 7.
The method of A in combination with elements 3 and 4.
The method of A in combination with elements 3 and 5.
The method of A in combination with elements 2 and 6.

The method of A in combination with elements 1 and 8.
The method of A in combination with elements 2 and 8.
The method of A in combination with elements 3 and 8.
The method of A in combination with elements 7 and 8.
The method of A in combination with elements 8 and 9.
The method of A in combination with elements 3, 4 and 6.
The method of A in combination with elements 3, 5 and 6.
The method of A in combination with elements 2, 4 and 8.
The method of A in combination with elements 2, 5 and 8.
The method of B in combination with elements 2 and 3.
The method of B in combination with elements 2 and 4.
The method of B in combination with elements 2 and 5.
The method of B in combination with elements 7 and 10.
The method of B in combination with elements 8 and 10.
The method of B in combination with elements 7 and 11.
The method of B in combination with elements 8 and 11.
The method of B in combination with elements 3, 10 and 12.
The method of B in combination with elements 3, 11 and 12.
The method of B in combination with elements 3, 7 and 10.
The method of B in combination with elements 3, 7 and 11.
The treatment fluid of C or the system of D in combination with elements 1 and 2.
The treatment fluid of C or the system of D in combination with elements 2 and 3.
The treatment fluid of C or the system of D in combination with elements 1 and 6.
The treatment fluid of C or the system of D in combination with elements 2 and 6.
The treatment fluid of C or the system of D in combination with elements 3 and 6.
The treatment fluid of C or the system of D in combination with elements 2 and 13.
The treatment fluid of C or the system of D in combination with elements 3 and 13.

To facilitate a better understanding of the embodiments of the present disclosure, the following examples of preferred or representative embodiments are given. In no way should the following examples be read to limit, or to define, the scope of the disclosure.

EXAMPLES

Example 1

Figure 3:
FIG. 3 shows an image of a latent hydrofluoric acid composition deposited in a pattern on a split core.
Figure 4:
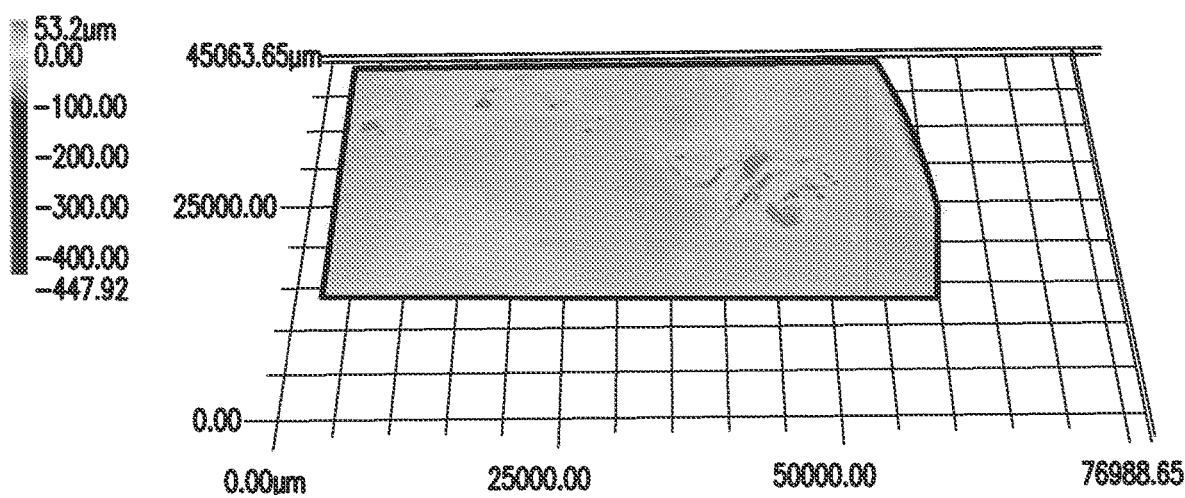
FIG. 4 shows an illustrative profilometry plot following differential etching of a split core.

Treatment of a Shale Core with a Latent Hydrofluoric Acid Composition. A Marcellus shale core sample was cut in two halves, and each half was polished to a smooth finish. Control 1 (no hydrofluoric acid precursor or particulates): Polylactic acid (PLA) was sandwiched between the two halves of the core sample. The two halves were then bound tightly together to simulate a fracture, and the bound core plus PLA was placed in a 15% HCl solution at 200° F. for 16 hours. No etching or pitting of the core sample was observed following the heating period. Control 2 (no particulates): A latent hydrofluoric acid composition was prepared by mixing a 1:1 weight ratio of PLA and ammonium bifluoride in methylene chloride. The thick slurry was then placed in a "pattern" upon a surface of the split core face, and the methylene chloride was allowed to evaporate. FIG. 3 shows an image of the latent hydrofluoric acid composition deposited in a pattern on the split core. The "pattern" was maintained upon evaporation of the methylene chloride and after binding the two core halves together. As in the first control sample, the two halves of the split core sample were then bound together to constrain the latent hydrofluoric acid composition within a simulated fracture. The bound core plus the latent hydrofluoric acid composition was similarly placed in 15% HCl at 200° F. overnight. Unlike the first control sample, visually distinct pitting and etching was observed upon the portions of the core face where the latent hydrofluoric acid composition was initially present. FIG. 4 shows an illustrative profilometry plot following differential etching of the split core. The locations of more intense grayscale color variation indicate where the most etching occurred. The etching regions closely matched the "pattern" of the deposited latent hydrofluoric acid composition (FIG. 3).

Figure 5:
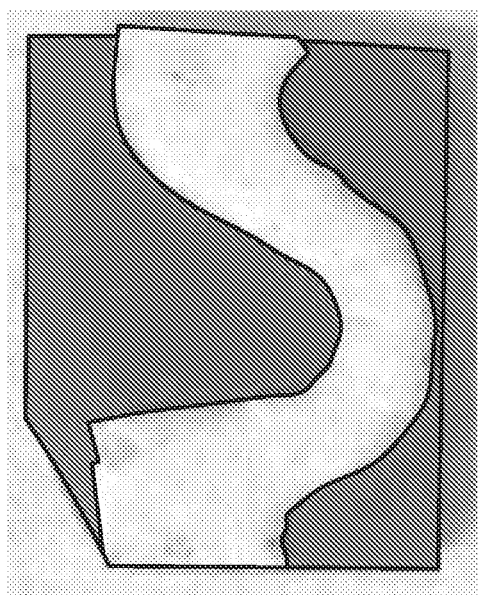
FIG. 5 shows an image of a latent hydrofluoric acid composition deposited upon a split core in a pattern before deposition of sand.
Figure 6:
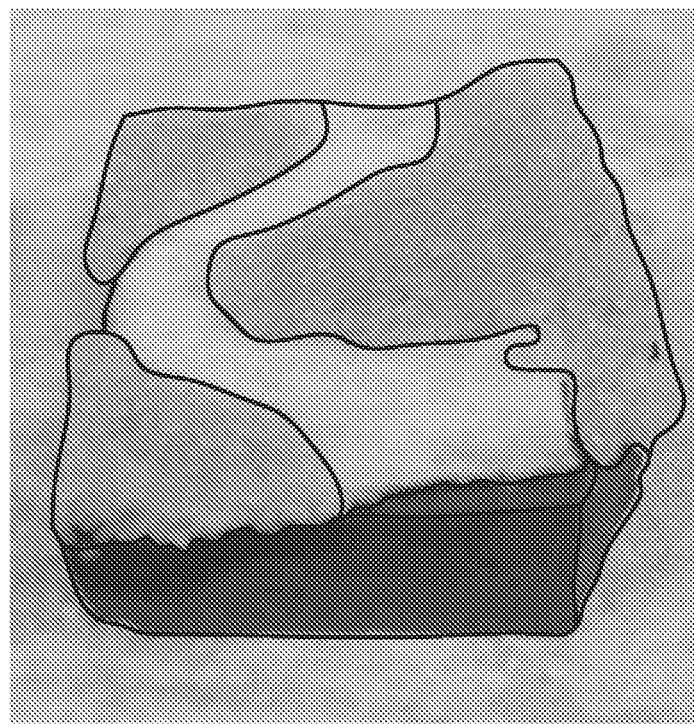
FIG. 6 shows an image of a latent hydrofluoric acid composition deposited upon a split core in a pattern after deposition of sand.
Figure 7:
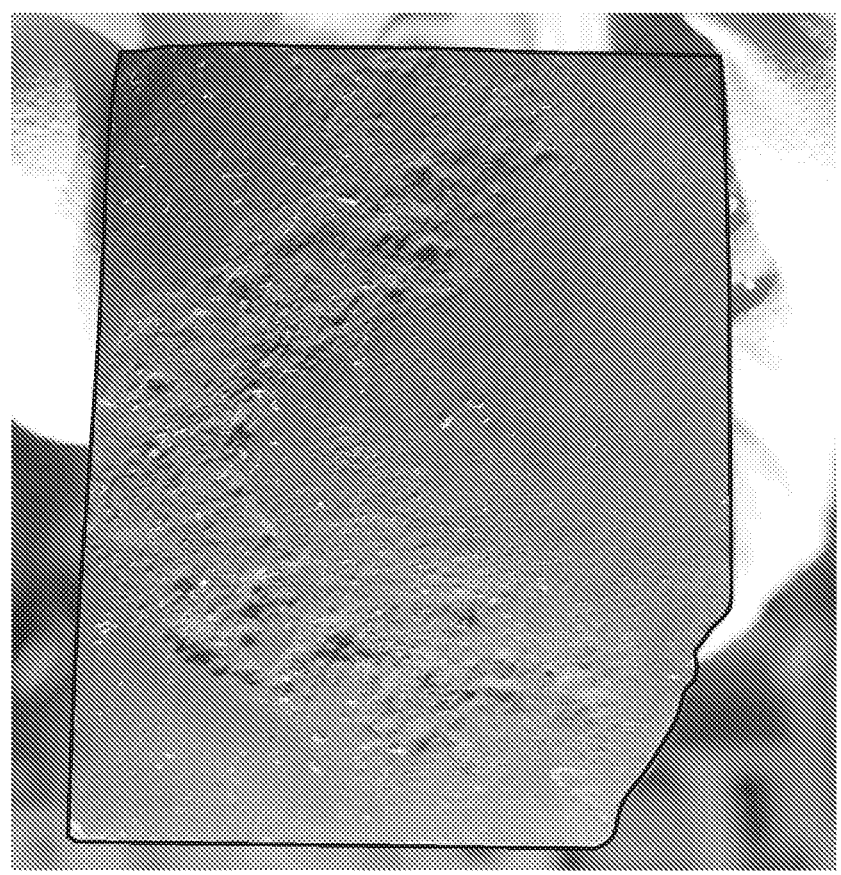
FIG. 7 shows an image of a split core following etching by hydrofluoric acid generated from a latent hydrofluoric acid composition.

Experimental (Both Hydrofluoric Acid Precursor and Particulates Present):

A latent hydrofluoric acid composition was formulated as above, except the ratio of polylactic acid to ammonium bifluoride was 1:1.5. The latent hydrofluoric acid composition was again deposited in a "pattern" upon one half of the split core, as shown in FIG. 5. Sand, wetted with 3% aqueous KCl, was placed upon either side of the patterned latent hydrofluoric acid composition to simulate the incorporation of the latent hydrofluoric acid composition within a proppant pack (FIG. 6). Afterward, the other half of the split core was placed upon the sand/latent hydrofluoric acid composition, and the two halves were bound together as above. The end of the simulated fracture was then covered with a MONEL® 100 mesh screen in order to constrain the sand and allow free fluid access to the fracture. Subsequently, the bound core plus the latent hydrofluoric acid composition were placed in 5% HCl at 200° F. for 3.5 days. Upon disassembly, the sand was still present, but it had migrated to the bottom of the simulated fracture. It is presumed that substantial lack of closure stress within the experimental setup allowed the sand to migrate following degradation of the polylactic acid and ensuing hydrofluoric acid generation. Similar to Control 2 above, etching of the core face occurred where the patterned latent hydrofluoric acid composition was initially present (FIG. 7). Compared to the mild etching observed in Control 2, where the sand particulates were not present, very intense etching was observed where the patterned latent hydrofluoric acid composition was initially present.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    preparing a treatment fluid comprising:
        an aqueous carrier fluid;
        a mineral acid, wherein the mineral acid is present in an amount of about 1% to about 20% by weight of the treatment fluid;
        a solid particulate; and
        a latent hydrofluoric acid composition, wherein the latent hydrofluoric acid composition comprises a degradable matrix and a hydrofluoric acid precursor dispersed in the degradable matrix, wherein the hydrofluoric acid precursor is selected from the group consisting of fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts, perfluorinated organic compounds, titanium fluoride, cesium fluoride, boron trifluoride, boron trifluoride complexes, or combinations thereof, and wherein the hydrofluoric acid precursor is present in an amount of about 1% to about 8% by weight of the latent hydrofluoric acid composition;
    introducing the treatment fluid into a wellbore or a subterranean formation comprising a siliceous material;
    forming a particulate pack comprising the solid particulate and the latent hydrofluoric acid composition, wherein the particulate pack comprises a proppant pack located within a fracture network defined in the siliceous material;
    degrading at least a portion of the degradable matrix using the mineral acid, thereby exposing at least a portion of the hydrofluoric acid precursor;
    converting the exposed hydrofluoric acid precursor into hydrofluoric acid; and
    reacting the hydrofluoric acid with the siliceous material adjacent to a location in the particulate pack where the latent hydrofluoric acid composition was present.

2. The method of claim 1, wherein the degradable matrix is acid-degradable.

3. The method of claim 2, wherein the degradable matrix comprises an acid-degradable polymer.

4. The method of claim 3, wherein the acid-degradable polymer comprises polylactic acid, any derivative thereof, or any combination thereof.

5. The method of claim 2, further comprising:
    introducing a second treatment fluid into the wellbore, the second treatment fluid comprising:
        an acid, an acid-generating compound, or any combination thereof;
        a plurality of the particulates; and
        the solid form of the latent hydrofluoric acid composition.

6. The method of claim 2, further comprising:
    after forming the particulate pack with a first treatment fluid, introducing a second treatment fluid comprising an acid, an acid-generating compound, or any combination thereof into the wellbore.

7. The method of claim 1, wherein the hydrofluoric acid precursor comprises a solid material.

8. The method of claim 1, wherein the siliceous material is present in a reservoir comprising a mineral selected from the group consisting of shale, sandstone, mudstone, and any combination thereof.

9. The method of claim 1, wherein the latent hydrofluoric acid composition and a plurality of the particulates are introduced into the wellbore in a first treatment fluid at or above a fracture gradient pressure of the siliceous material.

10. The method of claim 1, wherein the degradable matrix comprises at least one degradable polymer selected from the group consisting of polysaccharides, proteins, aliphatic polyesters, poly(hydroxyalkanoates), poly($\beta$-hydroxyalkanoates), poly(w-hydroxy alkanoates), polylactides, polyglycolides, poly($\epsilon$-caprolactone)s, poly(hydroxybutyrate)s, poly(alkylene dicarboxylates), polyanhydrides, poly(hydroxy ester ether)s, poly(ether ester)s, poly(ester amide)s, polycarbamates, polycarbonates, poly(orthoester)s, poly(amino acid)s, poly(ethylene oxide), polyphosphazenes, polyvinyl alcohol, methyl cellulose, ethyl cellulose, carboxymethyl cellulose, carboxyethyl cellulose, acetyl cellulose, hydroxyethyl cellulose, shellac, dextran, guar, xanthan, starch, scleroglucan, diutan, poly(vinyl pyrrolidone), polyacrylamide, polyacrylic acid, poly(diallyldimethylammonium chloride), poly(ethylene glycol), polylysine, polymethacrylamide, polymethacrylic acid, poly(vinylamine), any derivative thereof, any copolymer thereof, any salt thereof, or any combination thereof.

11. The method of claim 1, wherein the degradable matrix is continuous.

12. A method comprising:
    introducing a first treatment fluid into a wellbore penetrating a subterranean formation comprising a siliceous material, the first treatment fluid comprising:
        an aqueous carrier fluid;
        a mineral acid, wherein the mineral acid is present in an amount of about 1% to about 20% by weight of the treatment fluid;

a solid particulate; and a latent hydrofluoric acid composition, wherein the latent hydrofluoric acid composition is present in a solid form in the first treatment fluid, wherein the latent hydrofluoric acid composition comprises an acid-degradable matrix, and a hydrofluoric acid precursor dispersed in the acid-degradable matrix, wherein the hydrofluoric acid precursor is selected from the group consisting of fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts, perfluorinated organic compounds, titanium fluoride, cesium fluoride, boron trifluoride, boron trifluoride complexes, or combinations thereof, and wherein the hydrofluoric acid precursor is present in an amount of about 1% to about 8% by weight of the latent hydrofluoric acid composition;

setting a proppant pack within a fracture network defined in the siliceous material, the proppant pack comprising at least a portion of the plurality of particulates and the solid form of the latent hydrofluoric acid composition;

contacting the proppant pack with the mineral acid, thereby degrading at least a portion of the acid-degradable matrix, exposing at least a portion of the hydrofluoric acid precursor, and converting the exposed hydrofluoric acid precursor into hydrofluoric acid; and reacting the hydrofluoric acid with the siliceous material adjacent to a location in the proppant pack where the latent hydrofluoric acid composition was present.

13. The method of claim 12, wherein the acid-degradable matrix comprises an acid-degradable polymer.

14. The method of claim 13, wherein the acid-degradable polymer comprises polylactic acid, any derivative thereof, or any combination thereof.

15. The method of claim 12, further comprising:
introducing a second treatment fluid into the wellbore, the second treatment fluid comprising:
an acid, an acid-generating compound, or any combination thereof;
a plurality of the particulates; and
the solid form of the latent hydrofluoric acid composition.

16. The method of claim 12, further comprising:
introducing a second treatment fluid comprising the acid, an acid-generating compound, or any combination thereof into the wellbore, after setting the proppant pack within the fracture network with the first treatment fluid.

17. The method of claim 12, wherein the hydrofluoric acid precursor comprises a solid material.

18. The method of claim 12, wherein the siliceous material is present in a reservoir comprising a mineral selected from the group consisting of shale, sandstone, mudstone, and any combination thereof.

19. The method of claim 12, wherein the first treatment fluid is introduced into the wellbore at or above a fracture gradient pressure of the siliceous material.

20. The method of claim 12, wherein the degradable matrix comprises at least one degradable polymer selected from the group consisting of polysaccharides, proteins, aliphatic polyesters, poly(hydroxyalkanoates), poly(β-hydroxyalkanoates), poly(w-hydroxy alkanoates), polylactides, polyglycolides, poly(ε-caprolactone)s, poly(hydroxybutyrate)s, poly(alkylene dicarboxylates), polyanhydrides, poly(hydroxy ester ether)s, poly(ether ester)s, poly(ester amide)s, polycarbamates, polycarbonates, poly(orthoester)s, poly(amino acid)s, poly(ethylene oxide), polyphosphazenes, polyvinyl alcohol, methyl cellulose, ethyl cellulose, carboxymethyl cellulose, carboxyethyl cellulose, acetyl cellulose, hydroxyethyl cellulose, shellac, dextran, guar, xanthan, starch, scleroglucan, diutan, poly(vinyl pyrrolidone), polyacrylamide, polyacrylic acid, poly(diallyldimethylammonium chloride), poly(ethylene glycol), polylysine, polymethacrylamide, polymethacrylic acid, poly(vinylamine), any derivative thereof, any copolymer thereof, any salt thereof, or any combination thereof.

21. The method of claim 12, wherein the degradable matrix is continuous.

* * * * *